US009337586B2

(12) United States Patent
McDowell et al.

(10) Patent No.: US 9,337,586 B2
(45) Date of Patent: May 10, 2016

(54) APPARATUS AND METHODS FOR ELECTRICALLY GROUNDING A LOAD-SUPPORTING SURFACE

(71) Applicant: NEWPARK MATS & INTEGRATED SERVICES LLC, The Woodlands, TX (US)

(72) Inventors: James Kerwin McDowell, Lafayette, LA (US); Kenneth Edward Durio, Arnaudville, LA (US)

(73) Assignee: Newpark Mats & Integrated Sevices, LLC, The Woodlands, TX (US)

( * ) Notice: Subject to any disclaimer, the term of this patent is extended or adjusted under 35 U.S.C. 154(b) by 67 days.

(21) Appl. No.: 14/496,105

(22) Filed: Sep. 25, 2014

(65) Prior Publication Data

US 2015/0099377 A1   Apr. 9, 2015

Related U.S. Application Data

(60) Provisional application No. 61/888,580, filed on Oct. 9, 2013.

(51) Int. Cl.
| | |
|---|---|
| *H01R 4/64* | (2006.01) |
| *E01C 5/00* | (2006.01) |
| *E01C 9/00* | (2006.01) |
| *H01R 13/648* | (2006.01) |
| *H01R 43/26* | (2006.01) |
| *E01C 9/08* | (2006.01) |

(52) U.S. Cl.
CPC ............... *H01R 13/648* (2013.01); *E01C 9/08* (2013.01); *E01C 9/086* (2013.01); *H01R 43/26* (2013.01); *Y10T 29/49117* (2015.01)

(58) Field of Classification Search
CPC .... H01R 4/64; H01R 13/65802; E01C 9/083; E01C 9/086; E01C 9/00; E01C 5/005; E01C 5/00
See application file for complete search history.

(56) References Cited

U.S. PATENT DOCUMENTS

| | | | | | |
|---|---|---|---|---|---|
| 4,967,057 | A | * | 10/1990 | Bayless | ................... H05B 3/36 219/213 |
| 6,477,027 | B1 | * | 11/2002 | McKelvy | ................ H05F 3/025 174/544 |
| 6,511,257 | B1 | | 1/2003 | Seaux et al. | |

(Continued)

FOREIGN PATENT DOCUMENTS

| | | |
|---|---|---|
| EP | 1128713 A1 | 8/2001 |
| WO | 02072974 A1 | 9/2002 |

OTHER PUBLICATIONS

Hastings Grounding and Jumper Equipment, Grounding Mat, Jan. 2011, 1 pp.

(Continued)

*Primary Examiner* — Gary Paumen
(74) *Attorney, Agent, or Firm* — E. Randall Smith; Jones & Smith, LLP (57) ABSTRACT

Apparatus for electrically connecting and grounding at least two mechanically interconnectable, planar mats in a reusable load-supporting surface includes at least one removable, electrically-conductive cover configured to be engaged with each mat and extend at least partially across the top and/or bottom face thereof. Each cover includes at least one conductive interface configured to electrically connect its associated mat with at least one other mat in the load-supporting surface.

28 Claims, 7 Drawing Sheets

(56) References Cited

U.S. PATENT DOCUMENTS

| | | | | | |
|---|---|---|---|---|---|
| 7,404,690 | B2* | 7/2008 | Lukasik | ............ | E01C 5/18 404/29 |
| 7,427,172 | B2* | 9/2008 | Lukasik | ............ | E01C 5/18 404/17 |
| 7,645,962 | B2* | 1/2010 | Krossa | ............ | H01R 13/5845 219/541 |
| 8,061,929 | B2* | 11/2011 | Dagesse | ............ | E01C 9/086 404/34 |
| 8,382,393 | B1* | 2/2013 | Phillips | ............ | E01C 9/086 404/34 |
| 8,414,217 | B2* | 4/2013 | Rosan | ............ | E01C 11/24 404/35 |
| 8,545,127 | B2* | 10/2013 | Bleile | ............ | E01C 5/001 404/34 |
| 8,616,804 | B2* | 12/2013 | Corser | ............ | E01C 9/086 404/34 |
| 8,936,073 | B1* | 1/2015 | Phillips | ............ | E04B 5/02 166/75.11 |
| 2004/0253861 | A1* | 12/2004 | Schubert | ............ | H01H 3/141 439/206 |
| 2005/0239320 | A1* | 10/2005 | Folkema | ............ | A47G 27/045 439/404 |
| 2007/0258767 | A1* | 11/2007 | Tapp | ............ | B32B 5/02 404/36 |
| 2008/0075533 | A1* | 3/2008 | Fournier | ............ | E01C 9/08 404/41 |
| 2013/0051911 | A1* | 2/2013 | Corser | ............ | E01C 9/086 404/35 |
| 2013/0309008 | A1* | 11/2013 | Fournier | ............ | E01C 9/086 404/35 |
| 2014/0193196 | A1* | 7/2014 | Fournier | ............ | E01C 9/083 404/35 |

OTHER PUBLICATIONS

The World's Latest Trackway, Copyright Liontrackhire 2015, http://www.liontrackhire.com/trackway/, 8 pp.

Standard (Orange) Equi-Mat Personal Protective Ground Grid, Hubbell Power Systems, Inc., http://www.hubbellpowersystems.com/lineman/grounding/ground-grids/ground-grid.asp, 2 pp.

* cited by examiner

APPARATUS AND METHODS FOR ELECTRICALLY GROUNDING A LOAD-SUPPORTING SURFACE

The present application claims priority to U.S. Provisional Patent Application Ser. No. 61/888,580 filed on Oct. 9, 2013 and entitled "Apparatus and Methods for Electrically Grounding a Load-Supporting Surface", which is hereby incorporated by reference herein in its entirety.

FIELD OF THE DISCLOSURE

The present disclosure relates to load-supporting surface technology and, more particularly, to apparatus and methods for electrically grounding a load-supporting surface.

BACKGROUND

Temporary or semi-permanent support surfaces have been used for roadways, remote jobsites, industrial staging areas and the like in an ever-increasing myriad of industries, such as the construction, military, oilfield, transportation, disaster response, utilities and entertainment industries. These support surfaces are often made up of heavy duty, durable, all-weather thermoplastic mats, which are reusable and interlock together to form the support surface. In some instances, it is necessary or desirable to provide apparatus and methods to electrically ground at least a portion of the support surface.

For example, it may be necessary or desirable to use a temporary or semi-permanent electrically grounded support surface as part of an Equi-Potential Zone (EPZ). The EPZ is an arrangement typically designed so that dangerous electric potential differences do not appear across the body of a person working on or near ground-based machinery. An EPZ is often used during projects that involve working in close proximity to an energized power line. For example, in performing overhead power line (OHL) projects, the EPZ may prevent the installation crew from being subject to an electric shock caused by, for example, a circuit flash from the energized line to the conductors being worked on. In the EPZ, the equipment and personnel are on a work surface that is electrically conductive and grounded to provide a natural path for large electrical voltages to flow.

Presently know solutions for temporary, or semi-permanent, electrically grounded support surfaces include the use of aluminum access plates bolted together at each corner. These plates are believed to have one or more disadvantage. For example, the plates may not overlap one another and therefore require a flat underlying surface. Otherwise, the edges of the plate(s) may protrude above the underlying surface and form a trip hazard. For another example, the corners of the plates may need to be bolted together using small straps that may also form trip hazards. Often, these systems require a nut and bolt at each corner with the nut on the underside, an arrangement which is labor intensive and cumbersome. For yet another example, the aluminum plates may have considerable scrap value and thus require 24-hour security to prevent theft. For still a further example, these plates may not be useful or adapted to otherwise serve as support surfaces when electrical grounding is not required or needed.

It should be understood that the above-described features, capabilities and disadvantages are provided for illustrative purposes only and are not intended to limit the scope or subject matter of the appended claims or those of any related patent application or patent. Thus, none of the appended claims or claims of any related application or patent should be limited by the above discussion or construed to address, include or exclude each or any of the above-cited features, capabilities or disadvantages merely because of the mention thereof herein.

Accordingly, there exists a need for improved systems, articles and methods useful in connection with providing an electrically grounded support surface having one or more of the attributes or capabilities described or shown in, or as may be apparent from, the various portions of this patent application.

BRIEF SUMMARY OF THE DISCLOSURE

In some embodiments, the present disclosure involves apparatus for electrically connecting and grounding at least two mechanically interconnectable, planar mats in a reusable load-supporting surface deployed on or near the surface of the earth. The mats are constructed at least partially of impermeable plastic material and have top and bottom faces, multiple sides and at least one edge extending around each side thereof. The apparatus includes a plurality of removable, electrically-conductive covers, each configured to be coupled to another of the respective mats and extend at least partially across the top and/or bottom face thereof. Each cover has at least one conductive interface configured to contact and form an electrically conductive path with at least one conductive interface of an adjacent mat when the mats are mechanically interconnected in the load-supporting surface to electrically connect such mats. At least one grounding rod is configured to be electrically connected between at least one cover and the earth.

In various embodiments, each cover includes an outer frame and an inner mesh portion connected to the outer frame, both constructed at least partially of electrically-conductive material. At least one among the outer frame and the inner mesh portion of each cover has at least one conductive interface configured to electrically connect its corresponding mat to an adjacent mat when the mats are mechanically interconnected in the load-supporting surface.

In many embodiments, a method of electrically connecting and grounding at least two mechanically interconnectable, planar mats in a reusable load-supporting surface deployed on or near the surface of the earth includes releasably coupling each cover to its associated mat so that it stays positioned at least partially across the top surface of the mat until it is disconnected therefrom. Each cover forms at least one conductive interface configured to electrically connect its corresponding mat to another mat when the mats are mechanically interconnected in the load-supporting surface. A first mat is positioned relative to a second mat so that at least one conductive interface of the first mat contacts and forms an electrically conductive path with at least one conductive interface of the second mat. The first and second mats are mechanically, releasably, coupled together. At least one of the first and second mats is grounded.

Accordingly, the present disclosure includes features and advantages which are believed to enable it to advance support surface technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent application or any patent or patent application claiming priority hereto. On the contrary, the intention is to cover all modifications, equivalents and alternatives falling within the spirit and scope of this disclosure or any appended claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Figure 1:
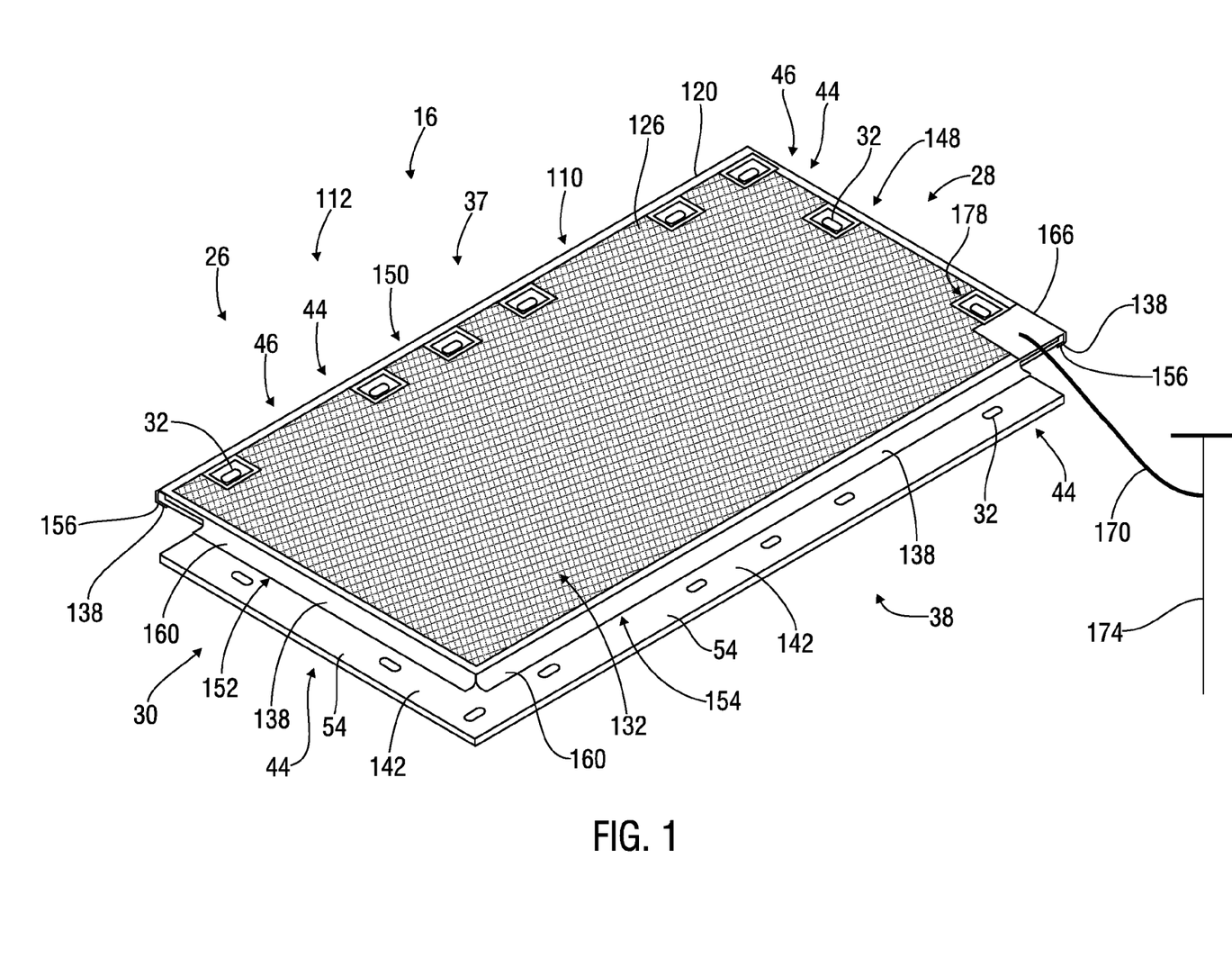
FIG. 1 is a perspective view of an exemplary load-supporting surfacing having a single mat equipped with an embodiment of an electrically-conductive cover in accordance with the present disclosure.
Figure 2:
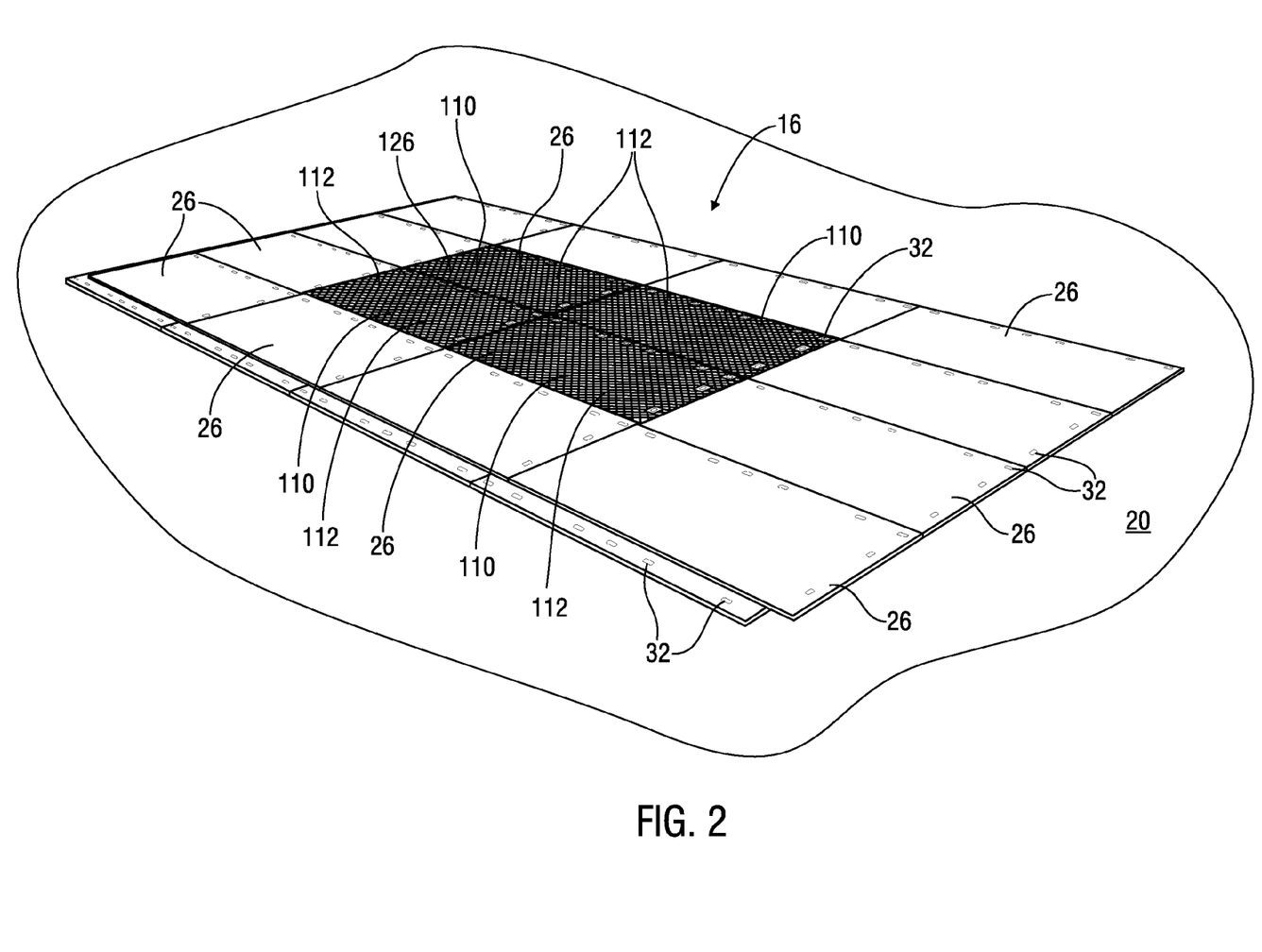
FIG. 2 is a perspective view of an exemplary load-supporting surfacing having multiple mechanically interconnected mats, some of which are equipped with an embodiment of an electrically-conductive cover and electrically coupled together and some of which are not equipped with an embodiment of an electrically-conductive cover or electrically coupled together in accordance with the present disclosure.

Referring initially to FIG. 1, an exemplary mat 26 is shown including an electrically-conductive cover 110 useful for allowing the mat 26 to be electrically grounded in accordance with an embodiment of the present disclosure. In this illustration, the mat 26 serves as a load-supporting surface 16 deployed on the ground or other surface. In other embodiments, such as shown in FIG. 2, a larger load-supporting surface 16 that includes multiple interconnected mats 26 is shown. In that example, the load-supporting surface 16 includes some mats 26 having electrically-conductive covers 110 and other mats 26 not having electrically-conductive covers. As used herein, the terms "EPZ mat" 112 and variations thereof refer to a mat 26 having an electrically-conductive cover 110. Thus, when multiple interconnected EPZ mats 112 are used, each electrically-conducive cover 110 is useful for allowing the load-supporting surface 16 to be electrically grounded. In the present embodiment, the load-supporting surface 16 (e.g. FIGS. 1 and 2) is reusable and capable of supporting the weight of personnel, vehicles and/or equipment thereupon.

Figure 3:
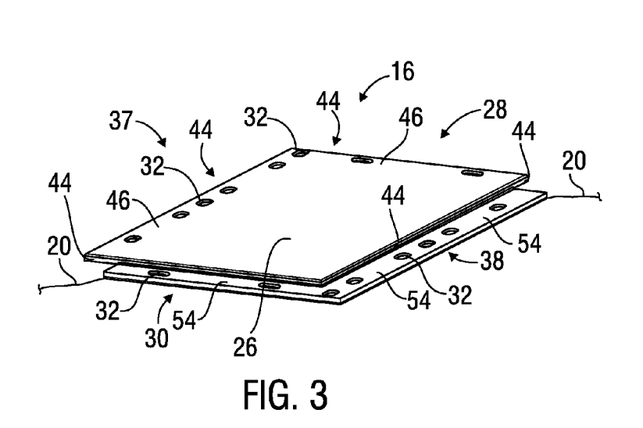
FIG. 3 is a perspective view of an exemplary mat useful in a load-supporting surface in accordance with the present disclosure.

Referring to FIG. 3, the mats 26 may have any suitable form, construction and configuration. Some examples of mats 26 which may be used in various embodiments of the present disclosure are shown and described in U.S. Pat. No. 5,653,551 to Seaux, entitled "Mat System for Construction of Roadways and Support Surfaces" and issued on Aug. 5, 1997, and U.S. Pat. No. 6,511,257 to Seaux et al., entitled "Interlocking Mat System for Construction of Load Supporting Surfaces" and issued on Jan. 28, 2003, both of which have a common Assignee as the present patent and the entire contents of which are hereby incorporated by reference herein in their entireties. For example, the mats 26 may be 14'×8' DURA-BASE® mats currently sold by the Assignee of this patent. If desired, the mats 26 may be used in connection with any of the components and features described and shown in U.S. patent application Ser. No. 13/790,916 filed Mar. 8, 2013 and entitled "Liquid Containment System for Use with Load-Supporting Surfaces", U.S. Provisional Patent Application Ser. No. 61/889,171 filed on Oct. 10, 2013 and entitled "Apparatus & Methods for Sealing Around the Opening to an Underground Borehole", U.S. Provisional Patent Application Ser. No. 61/857,474, filed on Jul. 23, 2013 and entitled "Apparatus and Methods for Providing Illuminated Signals from a Support Surface", U.S. patent application Ser. No. 14/336,163 filed on Jul. 21, 2014 and entitled "Apparatus and Methods for Providing Illuminated Signals from a Support Surface", each of which has a common Assignee as the present patent and the entire contents of which are hereby incorporated by reference herein in their entireties.

Still referring to FIG. 3, in the illustrated embodiment, each mat 26 is flat, or planar, and constructed of impermeable material, such as thermoplastic. The exemplary mat 26 has a rectangular shape with an opposing pair of short sides 28, 30, an opposing pair of long sides 37, 38, and an edge 44 extending along each side 28, 30, 37 and 38. In this particular example, the first short side 28 and first long side 37 each have an upper lip 46 extending horizontally outwardly therefrom, forming the edge 44 and which will be spaced above the earth's surface, or ground, 20 or other surface. The second short side 30 and second long side 38 each have a lower lip 54 extending horizontally outwardly therefrom below the edge 44 thereof and which will rest on or near the earth's surface, or ground, 20 or other surface. The upper and lower lips 46, 54 may have any suitable size, shape, configuration and length. It should be understood, however, that the electrically-conductive cover 110 of the present disclosure is not limited to use with the above-described embodiments of mats 26 having upper and/or lower lips 46, 54. For example, other embodiments of the cover 110 may be used in connection with mats 26 not having upper and/or lower lips 46, 54.

Still referring to the embodiment of FIG. 3, the respective upper and lower lips 46, 54 of different mats 26 are interconnectable with locking pins 34 (e.g. FIGS. 4 & 5) releasably securable through corresponding locking pin holes 32 formed therein. The locking pin holes 32 and locking pins 34 may have any suitable form, construction and configuration. In this embodiment, the illustrated mats 26 include a plurality of locking pin holes 32, each configured to accept a releasable locking pin 34 (e.g. FIG. 4) therethrough. Each illustrated mat 26 may include a total of sixteen locking pin holes 32, eight formed in each of the upper and lower lips 46, 54. In some embodiments, the locking pins 34 may form a fluid-tight seal around, or in, the locking pin holes 32 within which they are engaged. Some examples of locking pins 34 which may be used in various embodiments of the present disclosure are shown and described in U.S. Pat. No. 6,722,831 to Rogers et al, entitled "Fastening Device" and issued on Apr. 20, 2004, U.S. Provisional Patent Application Ser. No. 61/748,818, entitled "Apparatus and Methods for Connecting Mats" and filed on Jan. 14, 2013, and U.S. patent application Ser. No. 13/780,350, entitled "Apparatus and Methods for Connecting Mats" and filed on Feb. 28, 2013, all of which have a common Assignee as the present patent and the entire contents of which are hereby incorporated by reference herein in their entireties.

In the illustrated example, the locking pin holes 32 of the mats 26 have an oval-shape to accept an oval-shaped enlarged head 36 (e.g. FIGS. 4 & 5) of the illustrated locking pins 34. It should be noted, however, that the present disclosure is not limited to use with the above-described or referenced types and configurations of load-supporting surfaces 16, mats 26, locking pins 34 and locking pin holes 32, or to the disclosures of the above-referenced patents and patent applications. Any suitable load-supporting surfaces 16, mats 26, locking pins 34 and locking pin holes 32 may be used.

Figure 4:
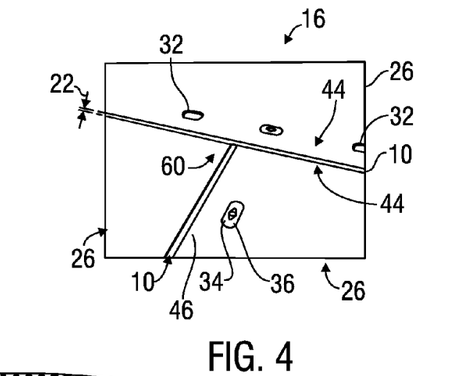
FIG. 4 is a top view of a portion of an exemplary load-supporting surface useful in accordance with an embodiment of the present disclosure.

Now referring to FIG. 4, in some embodiments, a gap 22 may be formed between adjacent edges 44 of adjacent interconnected mats 26 in the load-supporting surface 16 and one or more seal members 10 may be included therein. For example, the seal member(s) 10 may provide a fluid-tight seal in the gap 22 between adjacent mats 26 to prevent liquid introduced onto the load-supporting surface 16 from seeping or flowing between and below the load-supporting surface 16. Some embodiments of seal members 10 that may be used in the gaps 22 are disclosed in U.S. patent application Ser. No. 13/803,580, filed on Mar. 14, 2013 and entitled "Apparatus and Methods for Sealing Between Adjacent Components of a Load-Supporting Surface", U.S. Provisional Patent Application Ser. No. 62/013,899 filed on Jun. 18, 2014 and entitled "Load-Supporting Surface with Interconnecting Components and Top Side Seal Assembly for Sealing Therebetween and Methods of Assembly and Use Thereof", U.S. Provisional Patent Application Ser. No. 62/011,805 filed on Jun. 13, 2014 and entitled "Load-Supporting Surface with Interconnecting Components and Frame-Style Seal Assembly for Sealing Therebetween and Methods of Assembly and Use Thereof", all of which have a common Assignee as the present patent and the entire contents of which are hereby incorporated by reference herein in their entireties. The seal member 10 may also or instead be used between one or more mat 26 and one or more other component associated with the load-supporting surface 16, and/or between the other components themselves. Some examples of such additional components that may be useful in connection with load-supporting surfaces 16, such as berm members, spacers, drive-over barriers, liquid drain assemblies, etc., are shown and disclosed in U.S. patent application Ser. No. 13/790,916, entitled "Liquid Containment System for Use With Load-Supporting Surfaces" and filed on Mar. 8, 2013.

Figures 6A, 6B, 6C, 10A, 10B, 11:
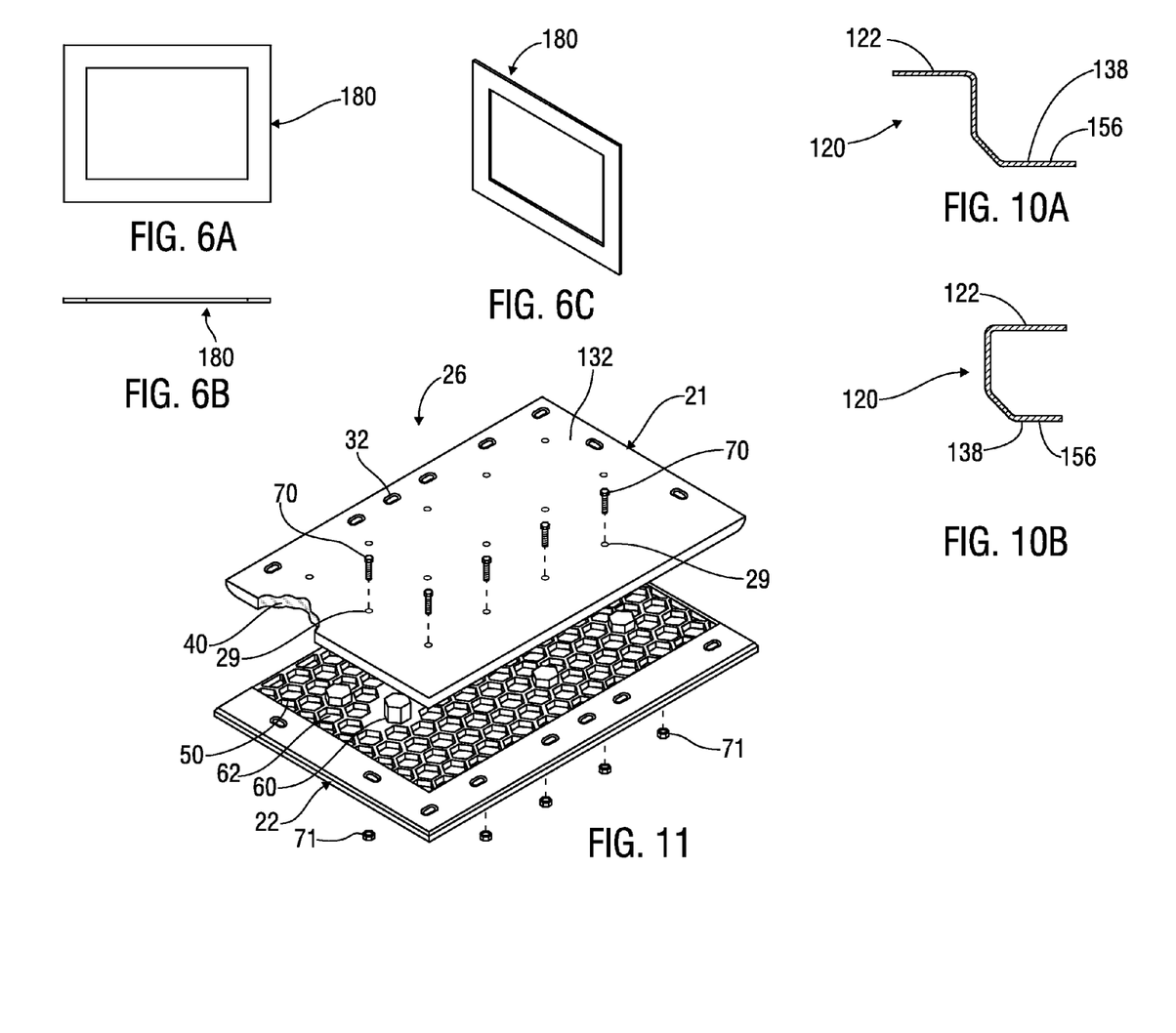
FIG. 6A is a top view of an exemplary frame useful as part of an electrically-conductive cover in accordance with an embodiment of the present disclosure.
FIG. 6B is a side view of the exemplary frame of FIG. 6A.
FIG. 6C is a perspective view of the exemplary frame of FIG. 6A.
FIG. 10A is a cross-sectional view of an embodiment of a frame useful as part of an electrically-conductive cover in accordance with an embodiment of the present disclosure.
FIG. 10B is a cross-sectional view of another embodiment of a frame useful as part of an electrically-conductive cover in accordance with an embodiment of the present disclosure.
FIG. 11 is an assembly view of an exemplary bolted mat with which an electrically-conductive cover may be used in accordance with an embodiment of the present disclosure.

Referring back to FIG. 1, in accordance with the present disclosure, the electrically-conductive cover 110 may have any suitable form, configuration and operation so that it can be used to allow the load-supporting surface 16 to be effectively and successfully grounded to the earth or other suitable structure. In the present embodiment, the electrically-conductive cover 110 includes an outer frame 120 (see also FIGS. 6A-C) and an inner mesh portion 126. The frame 120 and mesh portion 126 may be constructed of any suitable material and have any suitable configuration that allows the load-supporting surface 16 to be effectively and successfully grounded to the earth or other suitable structure. For example, the frame 120 and mesh portion 126 may be constructed at least partially of aluminum, stainless steel or other electrically-conductive material or a combination thereof. The illustrated frame 120 is a welded rectangular steel frame providing rigidity for the cover 110 and preserving its integrity during use, such as when the mat 112 is driven over by vehicles and machinery. The mesh portion 126 may be constructed of any suitable at least partially metallic mesh or grating, such as an aluminum mesh configuration that is sufficiently electrically conductive and sufficiently strong and durable to withstand use as part of a load-supporting surface.

Figure 5:
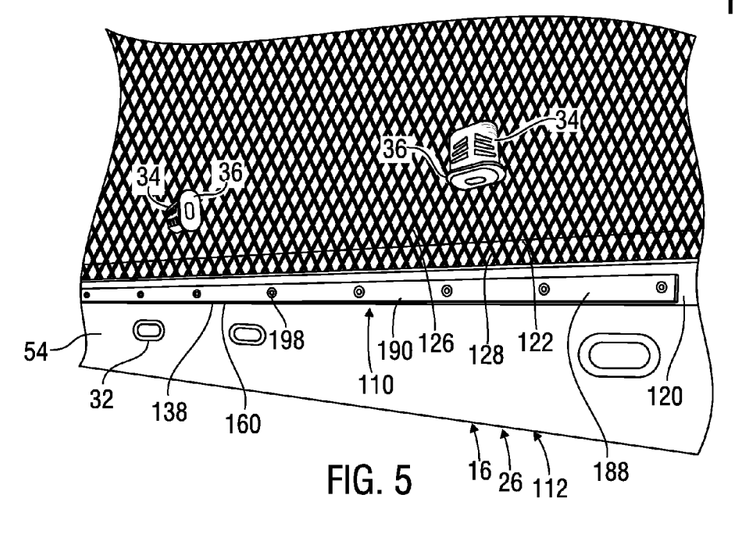
FIG. 5 is a top view of an exemplary mat equipped with an embodiment of an electrically-conductive cover in accordance with the present disclosure.

In this example, the frame 120 and mesh portion 126 are welded together. For example, as shown in FIG. 5, the perimeter edges 128 of the mesh portion 126 may be welded to the top 122 of the frame 120. However, the frame 120 and mesh portion 126 may be coupled together or interconnected in any other suitable manner.

Referring again to FIG. 1, the illustrated cover 110 also includes at least one conductive interface 138 useful to electrically connect the EPZ mat 112 with one or more adjacent EPZ mat 112. The conductive interface(s) 138 may have any suitable form, configuration and operation. In this embodiment, the cover 110 has an interface 138 extending on each side 28, 30, 37 and 38 of the mat 26 to electrically connect the mat 26 with a corresponding respective adjacent interconnected mats 26 (see e.g. FIGS. 2, 7-9). For example, the frame 120 may be used to form an interface 138 on each side 28, 30, 37 and 38 of the mat 26 that will abut, and thus electrically contact, an interface 138 on a respective adjacent interconnected mat 26. In the present embodiment, on each side 28, 37 of the mat 26 having upper lips 46, the frame 120 extends at least partially around the edge 44 thereof to form an underside face 156 (FIG. 9) which serves as the conductive interface 138 along that respective side of the mat 26 (See also FIGS. 8 & 9). On each side 30, 38 of the mat 26 having lower lips 54, the exemplary frame 120 extends at least partially across the top 142 of the lower lip 54 to form an upward face 160 that serves as the conductive interface 138 along that respective side of the mat 26. As shown in FIGS. 8 & 9, the respective interfaces 138 of adjacent interconnected EPZ mats 112 contact one another to form an electrically conductive path therebetween. However, the present disclosure is not limited to the above type and arrangement of interfaces 138. For example, there may be interfaces on less than all sides 28, 30, 37 and 38 of the mat 26. For another example, the interface(s) 138 may be disposed at specific locations on one or more sides of 28, 30, 37 and 38 of the mat 26 and/or at entirely different locations on the cover 110.

Referring to FIG. 5, if desired, a conductive booster 188 may be used in connection with one or more interface 138 of each mat 112, such as to assist in ensuring a good electrical connection between adjacent interconnected mats 112. The conductive booster 188 may have any suitable form, configuration and operation. In the illustrated embodiment, the booster 188 is a metallic braided band 190 inserted between the corresponding underside face 156 (see e.g. FIG. 9) and upward face 160 of the frames 120 on a pair of adjacent interconnected EPZ mats 112. The band 190 may, for example, have copper, aluminum or steel braiding and extend between a portion or all of the length of the adjacent faces 156, 160. In this embodiment, the band 190 is a copper braided band coupled, such as with rivets 198, screws or other connectors, to each upward face 160 of the frame 120 along its length. In other embodiments, multiple or few shorter sections of metallic braided band 190 may be used.

Figure 12A:
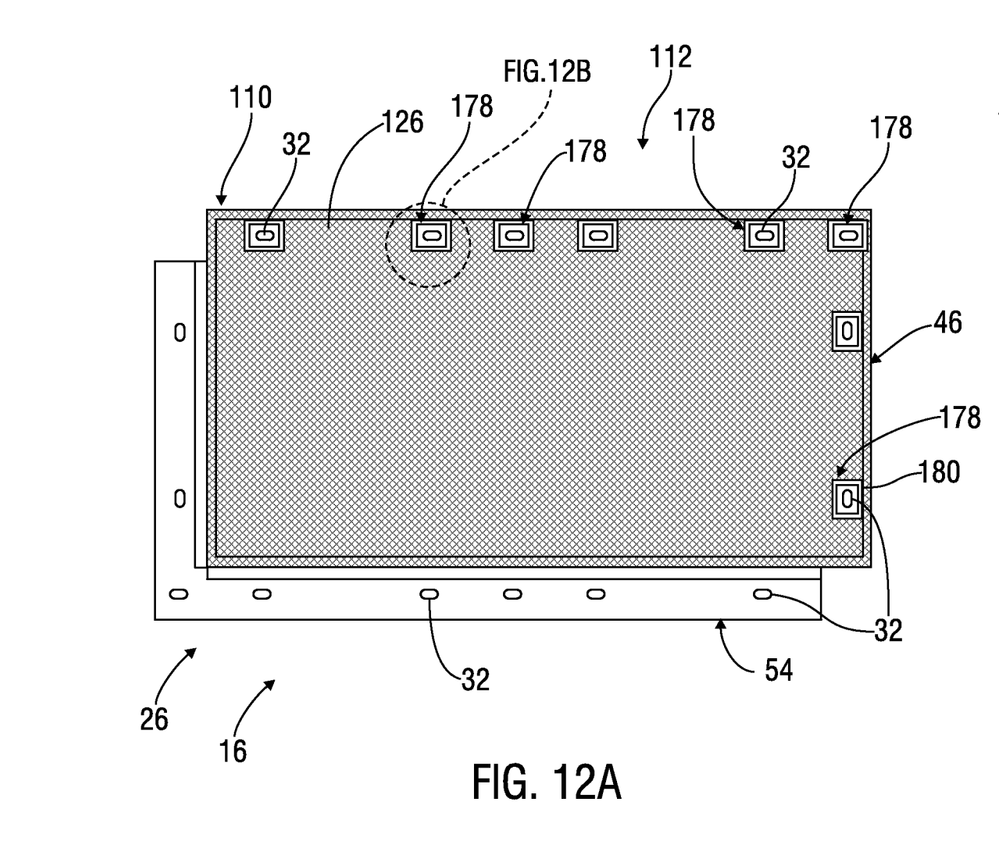
FIG. 12A is a top view of an exemplary load-supporting surfacing having a single mat equipped with an embodiment of an electrically-conductive cover in accordance with the present disclosure.
Figure 12B:
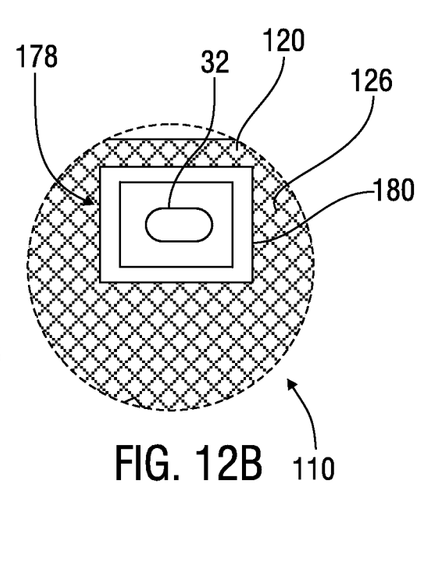
FIG. 12B is an exploded view of a portion of the load-supporting surface of FIG. 12A.

Referring to FIGS. 12A-B, if desired, the mesh portion 126 may include a cut-out 178 formed therein over each locking pin hole 32. For example, the cut-out 178 may be useful to electrically isolate a locking pin 34 (e.g. FIGS. 4 & 5) placed in the locking pin hole 32 and prevent electrical conductivity between the cover 110 and the locking pin 34. The cut-out 178 may have any suitable form, configuration and operation. In this example, each cut-out 178 is spaced away from its corresponding locking pin hole 32 to ensure sufficient electrical isolation. A cut-out frame 180 (see also FIGS. 6 & 8) constructed of any suitable material, such as one or more compatible metallic material (e.g. aluminum, steel, etc.), is shown connected to, such as by weld, and covering the edges of the mesh portion 126 that form the cut-out 178. The cut-out frame 180 may, for example, provide stability around the cut-out 178 and/or protect the exposed mesh portion 126 on the edges of the cut-out 178. However, the cut-out frame 180, if included, may be constructed of any other suitable material and connected with the mesh portion 126 or mat 26 in any other suitable manner.

At least one interconnected EPZ mat 112 of a load supporting surface 16 may be grounded to the earth or other structure in any suitable manner. Referring back to FIG. 1, for example, a metal plate 166 may be electrically connected, such as by weld, to the cover 110. In this embodiment, the plate 166 is welded atop the mesh portion 126 and frame 120 in one corner of the cover 110. A grounding cable 170 is shown electrically connected between the plate 166 and a grounding rod 174 that may be driven into the earth for electrically grounding the entire load-supporting surface 16. For example, any suitable commercially available grounding cable 170 and rod 174 and related components may be used, such as the grounding rod currently having Catalog No. 4370, stringing rod currently having Catalog No. 9738 and hanger studs currently having Catalog Nos. 13190-1 and 13210 currently sold by Hastings Hot Line Tools and Equipment.

In accordance with an embodiment of a method of assembly and use, the exemplary EPZ mat 112 may be assembled in any suitable manner. For example, referring to FIG. 1, the illustrated frame 120 and mesh portion 126 are connected, such as by weld. If desired, the frame 120 and mesh portion 126 may be painted with galvanized paint, such as to enhance its electrical conductivity and reduce or prevent corrosion. The exemplary cover 110 is positioned on the top face or surface 132 of the mat 26. The edges 148, 150 of the illustrated frame 120 that are aligned with the respective sides 28, 37 of the mat 26 may be at least partially bent around the edges 44 thereof. The edges 152, 154 of the illustrated frame 120 that align with the respective sides 30, 38 of the mat 26 may be at least partially bent down and out over part of the top 142 of the respective lower lip 54 (see also FIGS. 10A-B). In other embodiments, one or more of the edges 148, 150, 152, 154 of the frame 120 may be at least partially pre-formed or bent into its desired shape (see also FIGS. 10A-B) before placement of the cover 110 onto the mat 26.

It should be noted that in other embodiments, the cover 110 may also or instead extend at least partially across the bottom face or surface (not shown) of the mat 26, or may extend across only part of the top surface 132 of the mat 26. Likewise, the frame 120 may extend across a different portion, or all, of the lower lip 54 of the sides 30, 38 of the mat 26 and may, if desired, extend around the edges 44 thereof. Thus, the present disclosure is not limited to a cover 110 having a mesh portion 126 that extends over the entire top surface 132 of the mat 26 and a frame 120 that extends at least partially around the edges 44 of the sides 28, 37 and across at least a portion of the lower lip 54 of the sides 30, 38 of the mat 26. Any other suitable configuration may be used.

If desired, the frame 120 and/or mesh portion 126 may be further coupled to the mat 26, such as with one or more connector. For example, referring to FIG. 11, the mesh portion 126 (e.g. FIG. 1) may be connected, such as by tack weld, to multiple of the bolt heads 70 accessible at the top surface 132 of a "bolted" mat 26. Bolted mats 26 are formed, for example, by bolting two mat sections together, such as shown and described in U.S. Pat. No. 6,511,257 to Seaux et al., entitled "Interlocking Mat System for Construction of Load Supporting Surfaces" and issued on Jan. 28, 2003 (e.g. FIG. 6 therein).

Referring again to FIG. 1, the booster(s) 188 and metal grounding plate 166, if included on this particular mat 112, may be coupled to the cover 110, such as described above, in advance or at any desired time after the cover 110 is coupled to the mat 26. If the load-supporting surface 16 includes multiple EPZ mats 112 (e.g. FIGS. 2, 7), the overlapping lips 46, 54 of adjacent mats 26 are interconnected using locking pins 34 (e.g. FIGS. 4 & 5) as described above and in one or more of the patents and patent applications previously incorporated herein by reference. In the referenced embodiments, the exemplary locking pins 34 accurately position the adjacent mats 26 relative to one another and firmly interconnect them, avoiding unnecessary rises and falls and helping form a strong electrical connection therebetween.

Figure 7A:
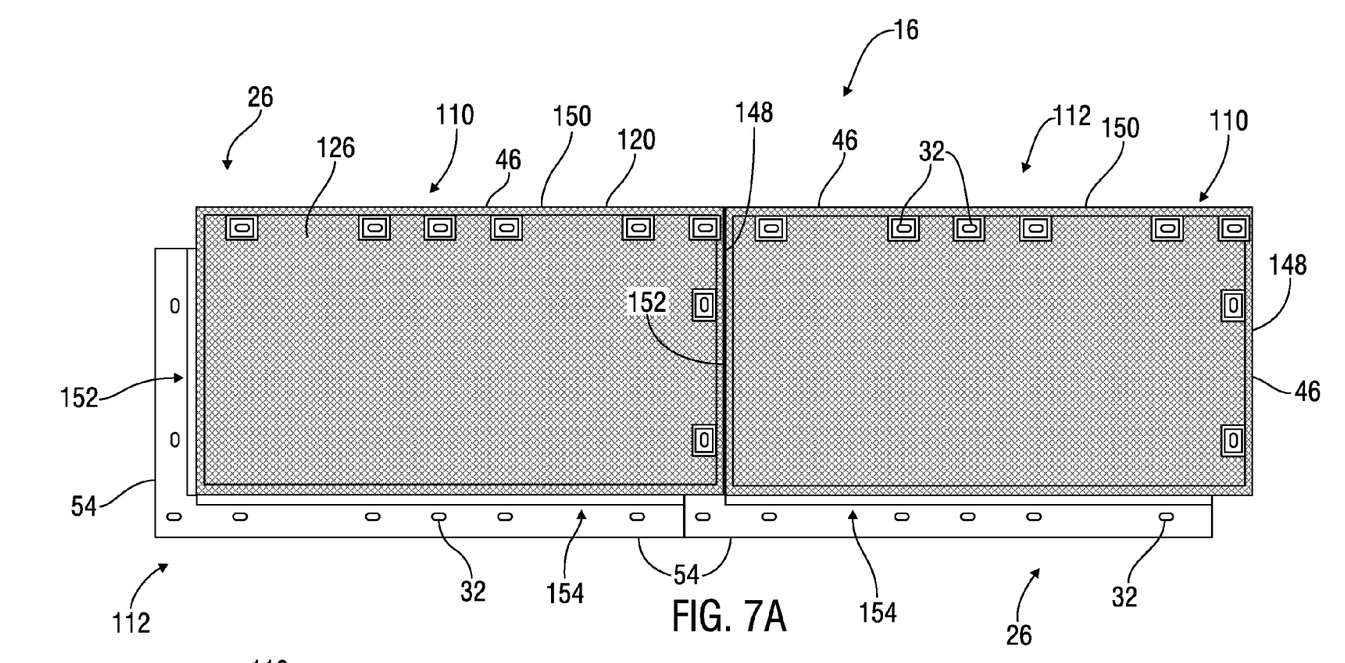
FIG. 7A is a top view of an exemplary load-supporting surface having two mats equipped with electrically-conductive covers in accordance with an embodiment of the present disclosure.
Figure 7B:
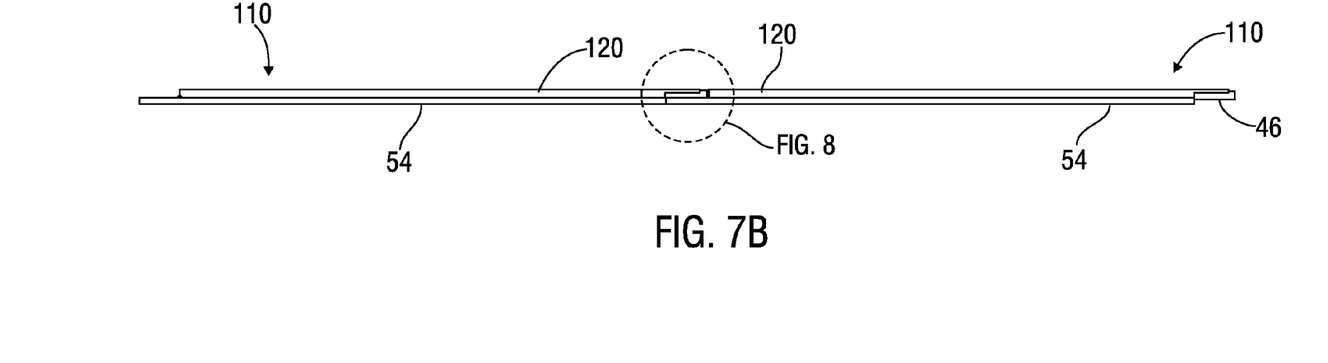
FIG. 7B is a side view of the load-supporting surface of FIG. 7A.
Figures 8, 9:
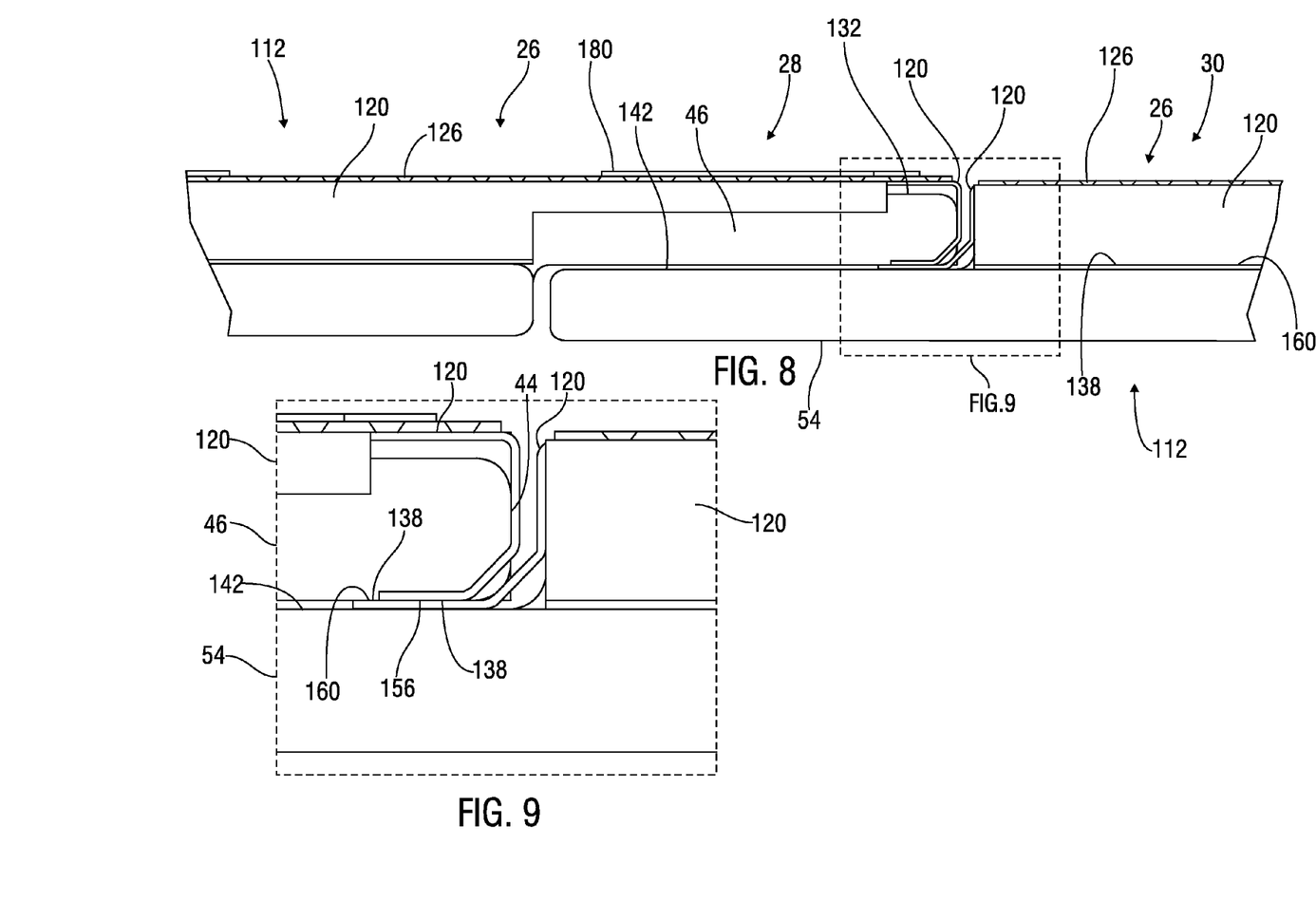
FIG. 8 is an exploded view of a portion of the load-supporting surface of FIGS. 7A and B.
FIG. 9 is an exploded view of a portion of the load-supporting surface of FIG. 8.

As shown in FIGS. 7-9, upon interconnection of the illustrated mats 112, the interfaces 138 of adjacent mats 112 will contact one another to electrically connect them together. Grounding of at least one mat 112 will electrically ground the series of interconnected mats 112 in the load-supporting surface 16. A low resistivity path is formed between each mat 112, allowing the flow electrical charge and limiting the rise of earth potential over the load-supporting surface 16. Electrical tests for the exemplary load-supporting surface 16 have demonstrated that they successful pass the current from one mat 112 to the next without substantial losses of electrical current or build-up of substantial heat.

After use, the mats 112 of a multi-mat load-supporting surface 16 may be disconnected from one another. In the present embodiment, the exemplary cover 110 of each EPZ mat 112 may be removed from its corresponding mat 26 and replaced onto the same or another mat 26. For example, if the cover 110 suffers extensive damage during use, it can be removed, repaired and/or replaced. The mat 26 may be reused with or without the cover 110.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of any appended claims, and may be made and used by one of ordinary skill in the art without departing from the spirit or teachings of the invention and scope of this disclosure and any appended claims. Thus, all matter herein set forth or shown in the accompanying drawings should be interpreted as illustrative, and the scope of the disclosure and any appended claims should not be limited to the embodiments described and shown herein.

The invention claimed is:

1. Apparatus for electrically connecting and grounding at least two mechanically interconnectable, planar mats in a reusable load-supporting surface deployed on or near the surface of the earth, the mats being constructed at least partially of impermeable plastic material and having top and bottom faces, multiple sides and at least one edge extending around each side thereof, the apparatus comprising:
    a plurality of removable, electrically-conductive covers constructed at least partially of electrically-conductive material,
    each one of said removable covers being configured to be coupled to another of the respective mats and extend at least partially across at least one among the top and bottom faces thereof, each said cover having at least one conductive interface configured to contact and form an electrically-conductive path with at least one said conductive interface of an adjacent mat when the mats are mechanically interconnected in the load-supporting surface to electrically connect such mats; and
    at least one grounding rod configured to be electrically connected between at least one said cover and the earth.

2. The apparatus of claim 1 wherein each mat and each said cover have rectangular shapes with four respective sides, further wherein each said cover includes a plurality of conductive interfaces, at least one said conductive interface disposed on each side of said cover.

3. The apparatus of claim 1 wherein said at least one conductive interface of each said cover comprises a portion of said cover configured to at least partially wrap around at least a portion of at least one side edge of its associated mat.

4. The apparatus of claim 3 wherein said cover includes multiple portions that at least partially wrap around multiple side edges of its associated mat, respectively, each said portion serving as a distinct said conductive interface of said cover.

5. The apparatus of claim 3 further including at least one metal plate welded to said cover and configured to be electrically coupled to at least one said grounding rod with at least one electrically-conductive grounding cable.

6. The apparatus of claim 3 wherein each said cover includes an outer frame and an inner mesh portion connected to said outer frame, said outer frame and inner mesh portion being constructed at least partially of electrically-conductive material, further wherein said outer frame includes said at least one conductive interface.

7. The apparatus of claim 6 wherein said inner mesh portion of each said cover extends across the top face of its associated mat.

8. The apparatus of claim 6 wherein each mat and each said cover have rectangular shapes, wherein said outer frame and said mesh portion of each said cover are welded together, further wherein each said outer frame comprises a welded steel frame and each said mesh portion comprises aluminum mesh material.

9. The apparatus of claim 8 further including at least one metal plate welded to said mesh portion and said frame of each said cover at a corner thereof and configured to be electrically coupled to at least one said grounding rod with at least one electrically-conductive grounding cable.

10. The apparatus of claim 6 wherein each mat includes a plurality of locking pin holes extending therethrough, each locking pin hole configured to receive a locking pin for mechanically interconnecting its associated mat with an adjacent mat in the load-supporting surface, further wherein said inner mesh portion of each said cover includes a plurality of cut-out portions, each said cut-out portion formed in said mesh portion around one of the respective locking pin holes of the associated mat.

11. The apparatus of claim 10 wherein each said cut-out portion is sized and configured to electrically isolate the corresponding locking pin hole and a locking pin placed therein from said frame.

12. The apparatus of claim 11 further including a cut-out frame engaged with each said cut-out of said mesh portion and extending around the associated locking pin hole, said cut-out frame being welded to said mesh portion.

13. The apparatus of claim 3 further including at least one conductive booster mechanically and electrically coupled to at least one said conductive interface of at least one mat and configured to electrically engage at least one said conductive interface of an adjacent mat when the mats are mechanically interconnected in the load-supporting surface.

14. The apparatus of claim 13 wherein said conductive booster includes at least one metallic braided band.

15. The apparatus of claim 3 wherein each mat includes at least one upper lip and at least one lower lip formed on different sides thereof and each extending along a portion of the outer perimeter thereof, the upper lip of each mat being configured to overlay the lower lip of an adjacent mat when the mats are mechanically interconnected in the load-supporting surface, wherein each said cover includes at least a first conductive interface configured to at least partially wrap around at least part of the side edge of an upper lip of its associated mat and at least a second conductive interface configured to at least partially wrap around at least part of the side edge of a lower lip of its associated mat, further wherein said first conductive interface of a first mat contacts and forms an electrically conductive path with said second conductive interface of a second mat when the mats are mechanically interconnected in the load-supporting surface to electrically connect the first and second mats.

16. The apparatus of claim 15 wherein each said cover includes an outer frame and an inner mesh portion connected to said outer frame, said outer frame and inner mesh portion being constructed at least partially of electrically-conductive material, further wherein said inner mesh portion extends at least partially across the top face of its associated mat and said outer frame includes said at least first and second conductive interfaces.

17. The apparatus of claim 16 wherein each mat includes a plurality of locking pin holes extending therethrough, each locking pin hole configured to receive a locking pin for mechanically interconnecting its associated mat with an adjacent mat in the load-supporting surface, further wherein said inner mesh portion of each said cover includes a plurality of cut-out portions, each said cut-out portion formed in said mesh portion around one of the respective locking pin holes of the associated mat.

18. The apparatus of claim 15 further including at least one conductive booster mechanically and electrically coupled to at least one said conductive interface of at least one mat and configured to electrically engage at least one said conductive interface of an adjacent mat when the mats are mechanically interconnected in the load-supporting surface.

19. The apparatus of claim 15 further including at least one metal plate welded to said mesh portion and said frame of each said cover and configured to be electrically coupled to at least one said grounding rod with at least one electrically-conductive grounding cable.

20. The apparatus of claim 1 wherein each said cover includes an outer frame and an inner mesh portion connected to said outer frame, said outer frame and inner mesh portion being constructed at least partially of electrically-conductive material, further wherein said outer frame includes said at least one conductive interface.

21. The apparatus of claim 20 wherein said inner mesh portion of each said cover extends at least partially across the top face of its associated mat.

22. The apparatus of claim 21 further including at least one metal plate welded to said mesh portion and said frame and configured to be electrically coupled to at least one said grounding rod with at least one electrically-conductive grounding cable.

23. The apparatus of claim 21 further including at least one conductive booster mechanically and electrically coupled to at least one said conductive interface of at least one mat and configured to electrically engage at least one said conductive interface of an adjacent mat when the mats are mechanically interconnected in the load-supporting surface.

24. Apparatus for electrically connecting and grounding at least two interconnectable, planar mats in a reusable load-supporting surface deployed on or near the surface of the earth, the mats constructed at least partially of impermeable plastic material, the apparatus comprising:
  at least one removable electrically-conductive cover disposed upon each mat and including an outer frame and an inner mesh portion connected to said outer frame, said outer frame and inner mesh portion being constructed at least partially of electrically-conductive material;
  at least one among said outer frame and said inner mesh portion of each said cover having at least one conductive interface, each said conductive interface being configured to electrically connect its corresponding mat to an adjacent mat when the mats are mechanically interconnected in the load-supporting surface; and
  a grounding rod configured to be electrically connected between at least one said cover and the earth.

25. A method of electrically connecting and grounding at least two mechanically interconnectable, planar mats in a reusable load-supporting surface deployed on or near the surface of the earth, the mats constructed at least partially of impermeable plastic material and having top and bottom faces, multiple sides and an edge extending around each side thereof, the apparatus comprising:
  positioning one among a plurality of removable, electrically-conductive covers at least partially across the top surface of each mat;
  releasably coupling each cover to its associated mat so that each cover stays positioned at least partially across the top surface of each mat during handling of the mat and until the cover is disconnected therefrom;
  each cover forming at least one conductive interface configured to electrically connect its corresponding mat to another mat when the mats are mechanically interconnected;
  positioning a first mat relative to a second mat so that at least one conductive interface of the first mat contacts and forms an electrically conductive path with at least one conductive interface of the second mat;
  mechanically, releasably, coupling the first and second mats together; and
  grounding at least one of the first and second mats.

26. The method of claim 25 further including
extending at least first and second portions of each cover at least partially around respective first and second side edges of its associated mat to releasably secure the cover to the mat and form at least first and second respective conductive interfaces, and positioning the first mat relative to the second mat so that the first conductive interface of the first mat contacts and forms an electrically conductive path with the second conductive interface of the second mat.

27. The method of claim 26 wherein each mat includes at least one upper lip and at least one lower lip formed on different sides thereof and each extending along a portion of the outer perimeter thereof, the upper lip of each mat being configured to overlay the lower lip of an adjacent mat when the mats are mechanically interconnected in the load-supporting surface, further including extending the first portion of each cover at least partially around at least part of the side edge of an upper lip of its associated mat to form the first conductive interface and extending the second portion of each cover at least partially around at least part of the side edge of a lower lip of the associated mat to form the second conductive interface, and positioning the first conductive interface of the first mat over and in contact with the second conductive interface of the second mat to form the electrically conductive path.

28. The method of claim 25 further including uncoupling the first and second mats together and uncoupling each cover from its respective mat.

\* \* \* \* \*